United States Patent [19]
Un et al.

[11] Patent Number: 6,040,850
[45] Date of Patent: Mar. 21, 2000

[54] METHOD FOR INTERFACING BETWEEN TRANSMITTER AND RECEIVER OF DIGITAL BROADCASTING SYSTEM THROUGH SATELLITE

[75] Inventors: Sung-Kyong Un; Hyun-Sook Cho; Hwan-Chul Kim; Soo-In Lee, all of Daejeon, Rep. of Korea

[73] Assignees: Electronics and Telecommunications, Daejeon; Research Institute Korea Telecom, Seoul, both of Rep. of Korea

[21] Appl. No.: 08/851,440

[22] Filed: May 5, 1997

[30] Foreign Application Priority Data

Oct. 9, 1996 [KR] Rep. of Korea .................. 1996-44702

[51] Int. Cl.[7] ...................................................... H04N 7/16
[52] U.S. Cl. .................................. 348/10; 455/3.2; 348/7
[58] Field of Search ................................... 348/10, 7, 12, 348/13; 455/3.2, 6.2, 6.3, 5.1, 4.2; 345/327; H04N 7/173, 7/16

[56] References Cited

U.S. PATENT DOCUMENTS 5,262,860 11/1993 Fitzpatrick et al. ..................... 358/142
5,570,295 10/1996 Isenberg et al. ......................... 364/512

*Primary Examiner*—Andrew I. Faile
*Assistant Examiner*—Alexander Berhe
*Attorney, Agent, or Firm*—Jacobson, Price, Holman & Stern, PLLC

[57] ABSTRACT

A method for interfacing between a transmitter and receiver of a digital broadcasting system using a satellite, includes the steps of: searching a program association table of the receiver for a corresponding program, and detecting a receiver control message packet number; detecting a receiver control message through the detected packet number; detecting public switched telephone network and public switched data network numbers through the receiver control message; searching for a network information table of the receiver and then detecting an event information table packet number at a time zone corresponding to an event information table construction descriptor, in order to search for a corresponding event information table; inserting a VCR reserved recording descriptor into the event information table to impose an identification number on a corresponding program, thereby performing a reserved recording; inserting a price information descriptor table into the event information table to transmit program price information; and inserting a caption information descriptor into the event information table to provide information about a caption of a program before broadcasting it.

6 Claims, 7 Drawing Sheets

METHOD FOR INTERFACING BETWEEN TRANSMITTER AND RECEIVER OF DIGITAL BROADCASTING SYSTEM THROUGH SATELLITE

BACKGROUND OF THE INVENTION

1. Field of the Invention

The present invention relates to a method for interfacing between a transmitter and receiver of a digital broadcasting system using a satellite. Specifically, this invention is relates to the kind, construction, and form of data of a resource and subscriber management system, which are transmitted to the receiver by the satellite.

2. Discussion of Related Art

Domestically, direct-broadcasting by a satellite has never been executed, whereas it has already been executed in foreign countries using an analog way. Satellite broadcasting service produces much more improved picture and audio quality, thereby providing more satisfactory reception state, compared to conventional broadcasting media. It also makes whole country put in a unitary broadcasting range. The satellite broadcasting has advantages in that it is not only applicable to various new media but also utilized in emergency caused by disaster. However, for the satellite broadcasting using the analog way, since fixed channels are allotted to each countries, the number of channels for transmission is restricted. Therefore, the satellite broadcasting cannot provide various services. Since a high-output satellite should be used, financial burden cannot be avoided. To solve these problems, digital satellite broadcasting system using a digital way, is being developed. In America, test broadcasting is being carried out. As a result of development in a video signal digitalizing technology like a digital image compressing and a semiconductor technology, transmission to one broadcasting repeater through many channels becomes available in the digital satellite broadcasting. Since the digital satellite broadcasting has satisfactory power efficiency in transmission, and so establishes a miniaturization of a receiving antenna. The digital satellite broadcasting also has advantages of controlling a subscriber's access to programs, collecting the subscriber's usage record, and providing various services such as a transmission of program guiding information. The various services are easily provided by transmitting messages through a satellite using a resource and subscriber management system.

The message formats of the digital broadcasting have been standardized by the International Standard Organization/International Electrotechnical Commission (ISO/IEC), Moving Picture Expert Group-2 (13818 MPEG-2) and Digital Video Broadcasting-System information (DVB-SI). The standard is being tested by some satellite broadcasting systems. However, the MPEG-2 and DVB-SI do not define structures for transmitting public switched telephone network and public switched data network number for automatically sending pay broadcasting subscription records; program guiding construction description information through which much amount of program guiding information is divided into packets; reserved recording information for automatically performing reserved recording; and program price information for showing the prices of programs.

SUMMARY OF THE INVENTION

Accordingly, the present invention is directed to a method for interfacing a transmitter and receiver of a digital broadcasting through a satellite that substantially obviates one or more of the problems due to limitations and disadvantages of the related art.

An object of the present invention is to provide a method for interfacing between a transmitter and receiver of a digital broadcasting system so as to transmit messages of a resource and subscriber management system, using a satellite.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for interfacing between the transmitter and receiver of the digital broadcasting system using the satellite, includes the steps of: searching a program association table of the receiver for a corresponding program, and detecting a receiver control message packet number; detecting a receiver control message using the detected packet number; detecting public switched telephone network and public switched data network numbers through the receiver control message; searching for a network information table of the receiver and an event information table packet number at a time zone corresponding to an event information table construction descriptor in order to search for a corresponding event information table; inserting a VCR reserved recording descriptor into the event information table to impose an identification number on the corresponding program, thereby performing a reserved recording; inserting a price information descriptor table into the event information table to transmit program price information; and inserting a caption information descriptor into the event information table to provide information about a caption of the program before broadcasting it.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the present invention.

DETAILED DESCRIPTION OF PREFERRED EMBODIMENT

Reference will now be made in detail to the preferred embodiments of the present invention, examples of which are illustrated in the accompanying drawings.

With reference to the attached drawings, a preferred embodiment of the present invention is described in detail.

Figure 1:
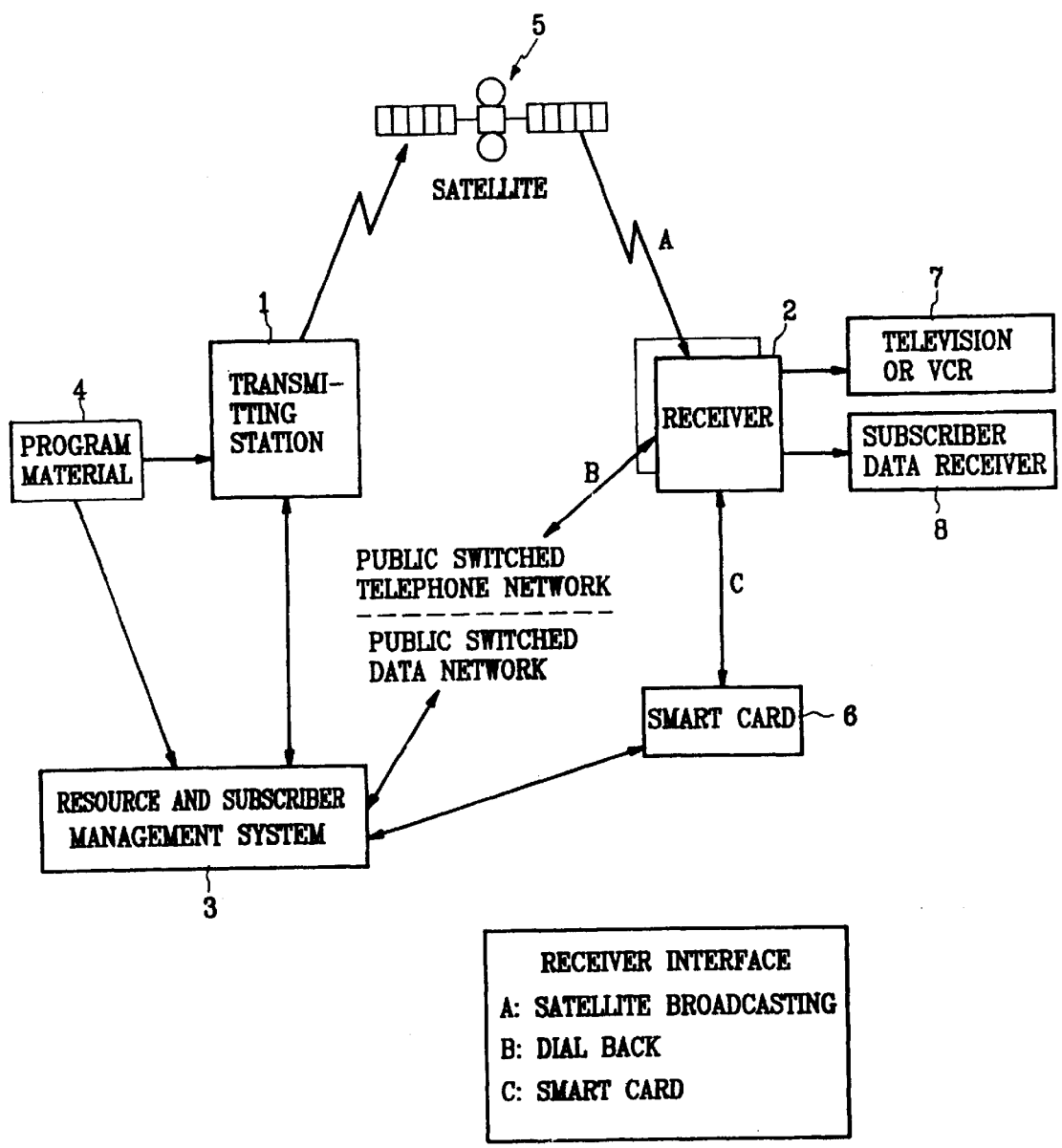
FIG. 1 illustrates the configuration of a broadcasting system through a satellite, according to the present invention.

As shown in FIG. 1, a satellite system is composed of transmitting station 1, resource and subscriber management system 3, and receiver 2. Transmitting station 1 receives and processes program materials 4 from outer systems, and then transmits the processed materials to receiver 2 through the satellite. A satellite broadcasting system which is located within the broadcasting service area through Korean satellite "Mugungwha", can support maximum 6 transmitting stations.

Resource and subscriber management system 3 controls subscriber's access to programs and collects subscriber's usage record. For these operations, an operator of the resource and subscriber management system issues smart card 6 to a subscriber. Smart card 6 is a portable card of a credit card size. It is inserted to the receiver so that the subscriber can receive pay TV channels or pay TV programs. Receiver 2 processes or converts signals from the satellite, and transmits them to television or VCR 7 and subscriber data receiver 8.

Figure 2:
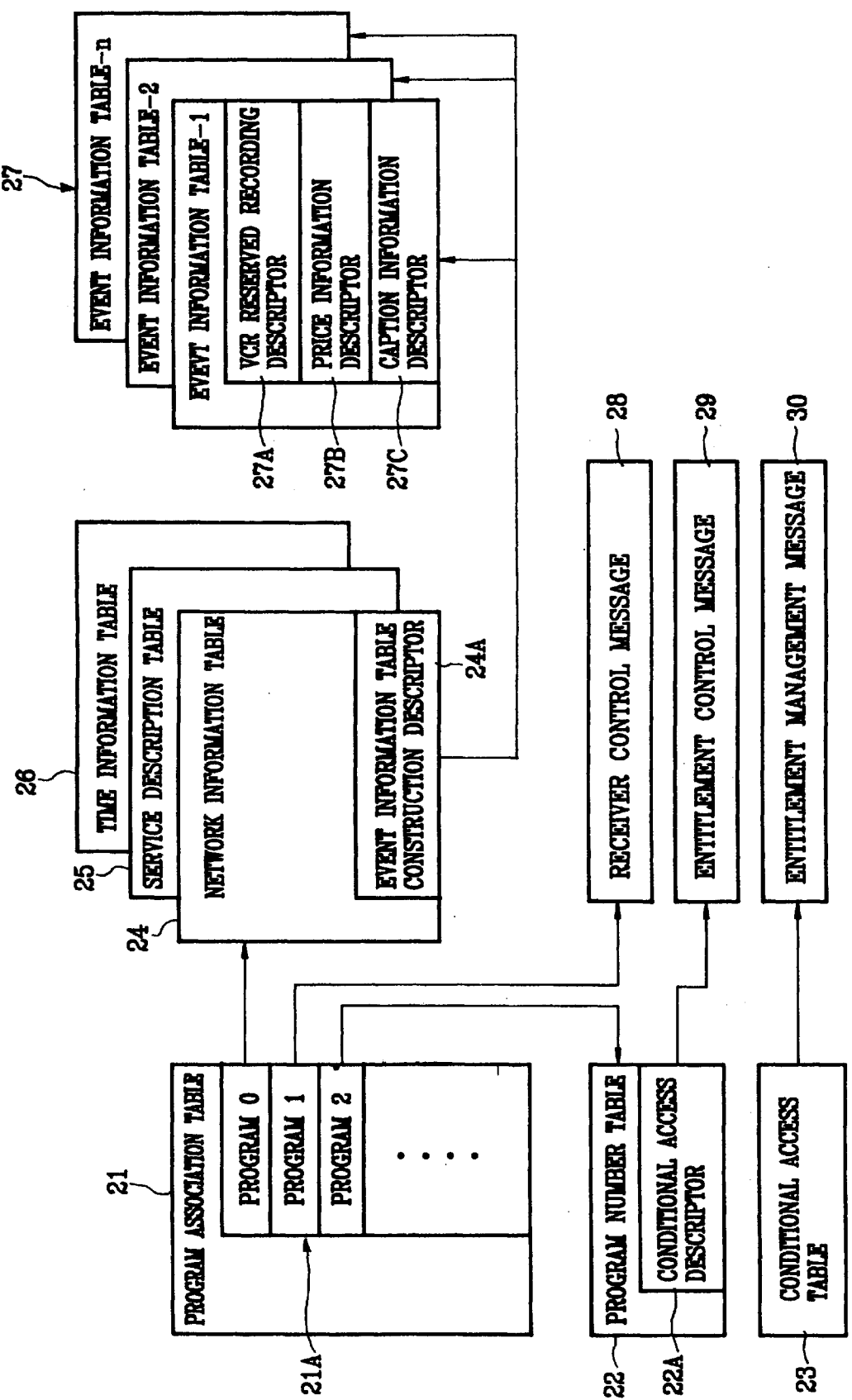
FIG. 2 is a block diagram of each information table of the present invention.

In FIG. 2, partial or whole descriptions of tables defined by international commissions and organizations are omitted. The tables are program association table (PAT) 21, program map table (PMT) 22, conditional access descriptor 22A, conditional access table (CAT) 23, network information table (NIT) 24, service description table (SDT) 25, time data table (TDT) 26, event information table (EIT) 27, entitlement control message (ECM) 29, and entitlement management message (EMM) 30.

Those who transmit pay per view programs to subscribers, can charge the fee for the programs which the subscribers watched, through viewing records of each subscriber. The viewing records can be obtained through a particular part of the receiver where the viewing records are stored, which the subscriber gives to those who send programs, and through an automatic detecting way using a public communications network.

In order to detect the viewing records using the public communications network, the numbers of the public switched telephone network and public switched data network are necessary for connecting to the public communication network. The numbers can be fixed or variable. Considering changes hereafter, however, the numbers should be variable to be readily changed.

The MPEG-2 and DVB-SI do not define the configuration which is capable of transmitting the variable values, so that only the fixed values can be utilized in a conventional art. The present invention defines the configuration of a receiver control message (RCM) for transmitting the variable values.

Figure 4:
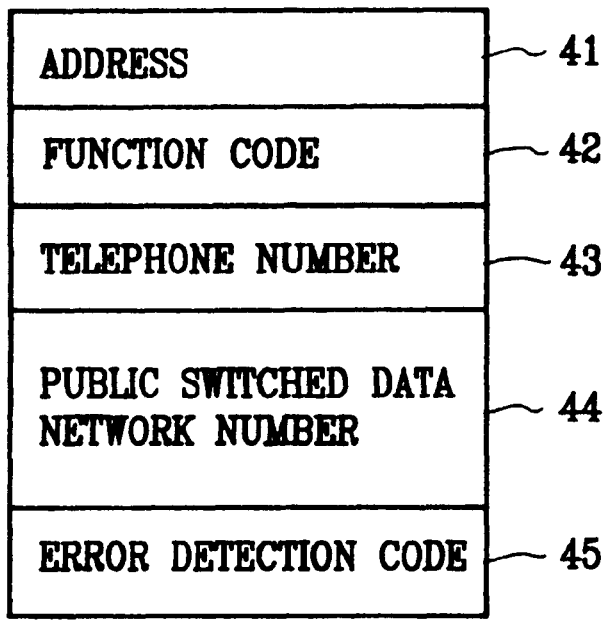
FIG. 4 is a block diagram of a receiver controlling message table of the present invention.

The following is about a method of searching for the RCM and interpreting it. As shown in FIG. 2, program association table 21 of the system uses fixed packet numbers. The receiver detects the program association table, and then searches for a location 21A where a program number is 1. An RCM packet number is detected from the location of the program number 1, 21A, which has the RCM packet number. The RCM is detected by its detected packet number, and then the telephone number and public switched data network number are detected through the construction of the RCM. The construction of the RCM is described in detail with reference to FIG. 4.

Each receiver, which proper addresses are imposed on, can recognize the construction of an available RCM whose address 41 is identical to or contains that of the receiver. Function code 42 discriminates the RCMs. Telephone number 43 is a number to which the receiver must be connected. After connected to the telephone of the telephone number 43, the receiver is connected to a billing system through public switched data network number 44. Error detection code 45 determines if errors occur while data is transmitted between the RCMs. If errors occur, the receiver cannot utilize the RCMs.

The amount of program guiding information is relatively greater than those of other information. Where the program guiding information is transmitted through only one packet number, the receiver must process much amount of information, and so a great storage space is needed. The DVB-SI utilizes only one packet number so that its configuration does not allow a separated transmission. To remove such defect, the present invention separately transmits the event information tables at each time zone, and defines an event information table construction descriptor, which is capable of discriminating the event information tables at every time zone. Event information table (EIT) construction descriptor 24A is inserted to network information table (NIT) 24 for transmission of packet numbers of the event information tables of each time zone. The receiver detects network information table (NIT) 24, and then detects a packet number of the event information table at a particular time zone from event information table construction descriptor 24A included in network information table 24 so as to detect corresponding event information table 27.

Figure 3:
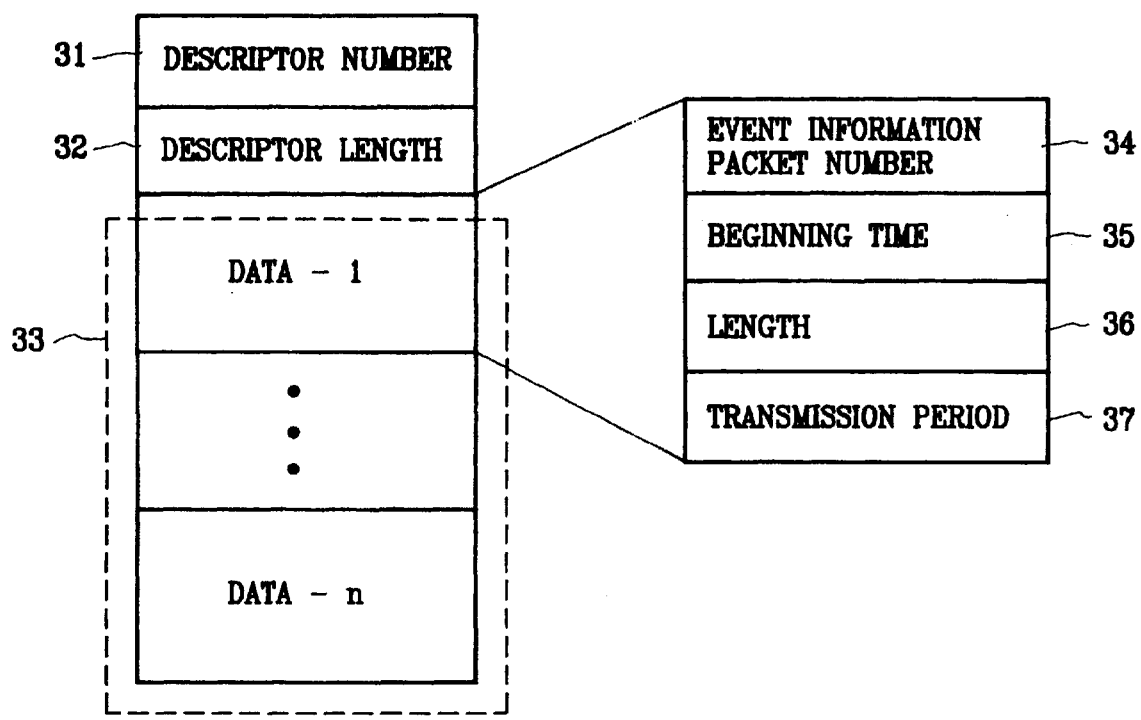
FIG. 3 is a block diagram of an event information table of the present invention.

As shown in FIG. 3, descriptor number 31 is for discriminating descriptors of each event information table. Descriptor length 32 represents the total length of the event information table construction descriptor. Event information table packet number 34 indicates a particular event information table which includes guiding information on programs broadcasted between beginning and ending times. Beginning time 35 signifies a time at which the program guiding information of the event information table starts. Its data value is a difference between present time and starting time. Length 36 is a time length from beginning to ending points of the time zone of the program guiding information included in the event information table. Transmission period 37 indicates the length of time where the event information tables are repeated.

In order to perform a reserved recording with a VCR, a subscriber must be informed of information such as a channel number, beginning time, and length of a program. In order to perform the reserved recording without such information, the program's identification number must be transmitted. The existing standard DVG-SI does not define the above information. The present invention defines VCR reserved recording descriptor 27A, and transmits the program's identification number to the receiver, thereby performing the reserved recording even though the subscriber does not know the program information.

Figure 5:
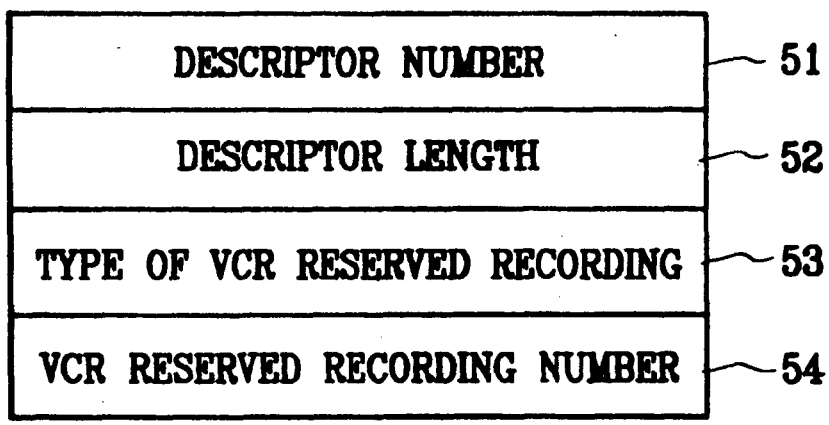
FIG. 5 is a block diagram of a VCR reserved recording descriptor table of the present invention.

As shown in FIG. 5, descriptor number 51 is for discriminating VCR reserved recording descriptors. Descriptor length 52 indicates a total length of the VCR reserved recording descriptor. VCR reserved recording type 53 is a code for discriminating different recording ways where there are many ways for performing the VCR reserved recording. VCR reserved recording number 54 represents an identification number imposed on each VCR reserved recording way.

For pay per view programs, a subscriber should be allowed to be previously informed of the price of a program to determine whether to watch the program or not. However, the existing standard DVB-SI does not define a method for sending program price information. To solve the problem, the present invention inserts price information descriptor table 27B capable of transmitting the program price information into event information table 27.

Figure 6:
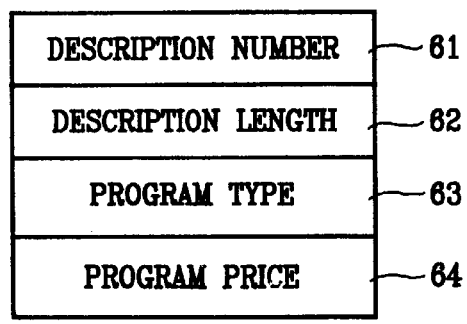
FIG. 6 is a block diagram of a price information descriptor table of the present invention.

As shown in FIG. 6, descriptor number 61 discriminates the descriptors of each price information descriptor table 27B. Descriptor length 62 is a total length of price information descriptor table 27B. Program type 63 is for discriminating pay per view programs of different types. Program price 64 is price information of the corresponding program.

Where a program is captioned, a subscriber cannot know what language is used in the caption, and the type and channel number of the program before he/she actually watches the program. Such information is important for the subscriber because it can be a reference for determining whether to watch the program or not. The existing standard DVB-SI does not support a configuration which is capable of transmitting such information. Other than the definition on event information table 27 by the DVB-SI, the present invention inserts caption information descriptor 27C defined by the system into event information table 27.

Figure 7:
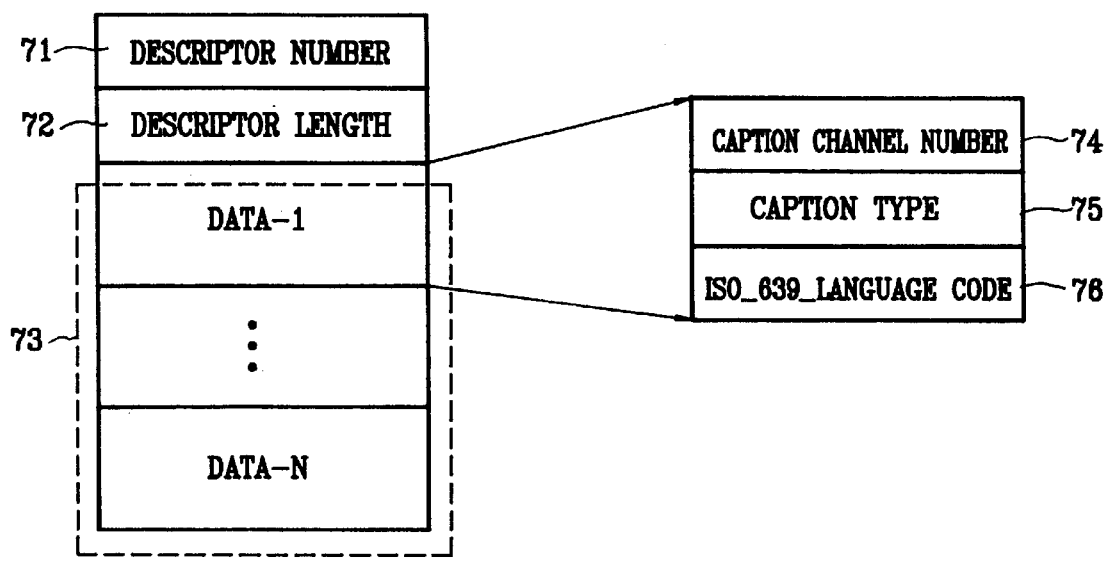
FIG. 7 is a block diagram of a caption information descriptor table of the present invention.

As shown in FIG. 7, descriptor number 71 discriminates the descriptors of each caption information descriptor table 27C. Descriptor length 72 represents a total length of caption information descriptor table 27C. Caption channel number 74 is a code for discriminating different captions of the program. Caption type 75 is a code for discriminating different types of the caption. Language code 76 is a code for a language of the caption.

The following is a description of the procedure of detecting the receiver control message.

Figure 8:
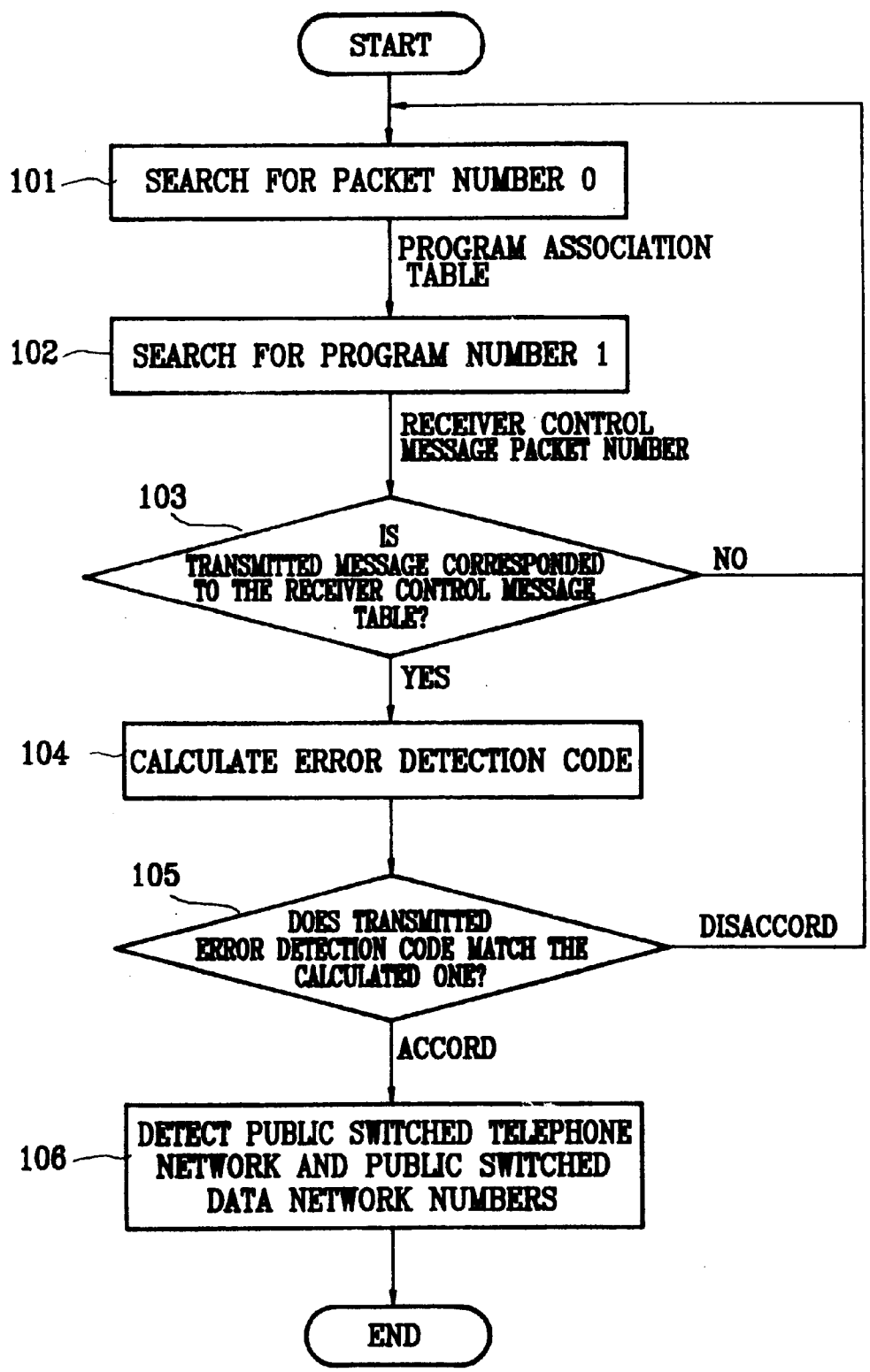
FIG. 8 is a flow chart of detecting a receiver control message, according to the present invention.

As shown in FIG. 8, the receiver detects a packet of number 0 (step 101). The receiver searches the program association table for a program number 1 (step 102). The message transmitted is checked to determine if it is for the relevant receiver control message table (step 103). Where the message is not for the receiver control message table, the procedure turns back to the step 101 to resume the message detection. Where the message is for the receiver control message table, the error detection code is calculated (step 104). The calculated error detection code is compared to the transmitted one (step 105). Where they do not match, the procedure turns back to the step 101 to resume the message detection. Where they match in step 105, the procedure ends after detecting public switched telephone network and public switched data network numbers in step 106.

Figure 9:
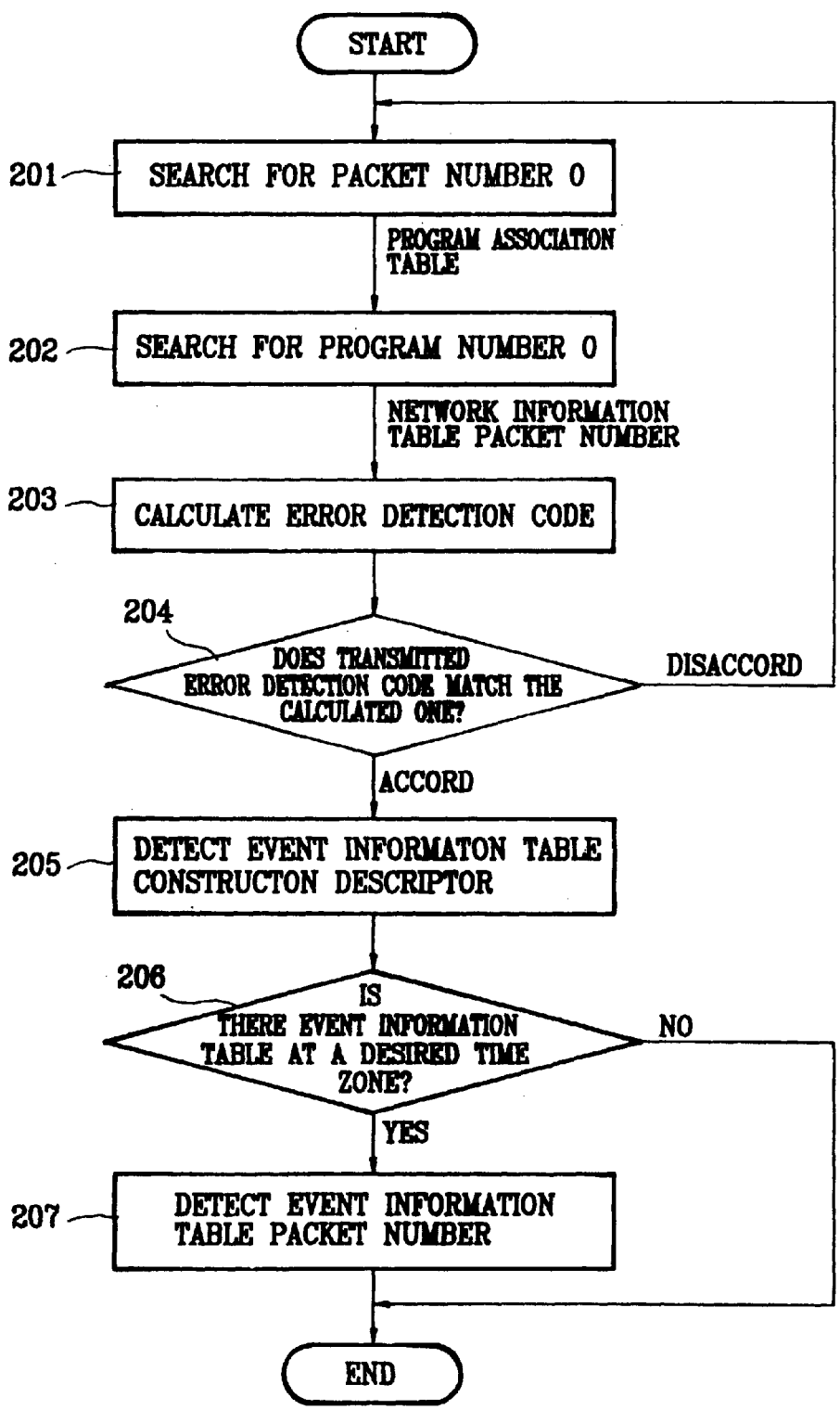
FIG. 9 is a flow chart of detecting a construction descriptor of the event information table, according to the present invention.

FIG. 9 is a flow chart of detecting event information table construction descriptor. The receiver detects a packet number 0 (step 201). The receiver searches the program association table for a program 0 (step 202). The error detection code of the network information table packet number is calculated (step 203). The calculated error detection code is compared to the transmitted one (step 204). Where they do not match, the procedure turns back to the step 201 to resume the message detection. Where they match in step 204, an event information table construction descriptor is detected (step 205). An event information table is checked to determine that it is one which corresponds to the desired time zone (step 206). Where the event information table corresponds to the desired time zone in step 206, the event information table packet number is detected (step 207), and then the procedure ends. Where the event information table does not correspond to the desired time zone, the procedure ends right after the step 206.

As described above, the present invention provides configurations and transmission methods of resource and subscriber management system messages, thereby efficiently providing: (1) public switched telephone network and public switched data network numbers information necessary to automatically transmit the viewing records of pay broadcasting; (2) program guiding construction description information necessary to divide much amount of program guiding information into many packets so as to separately transmit them; (3) reserved recording information for automatically reserving a record; and (4) program price information which informs the prices of programs.

It is apparent to those skilled in the art that various modifications and variations can be made in configurations and transmission methods of resource and subscriber management system messages of the present invention without departing from the spirit or scope of the invention. Thus, it is intended that the present invention cover the modifications and variations of this invention provided they come within the scope of the appended claims and their equivalents.

What is claimed is:

1. A method for interfacing between a transmitter and receiver of a digital broadcasting system using a satellite, the method comprising the steps of:

searching a program association table of the receiver for a relevant program number, and detecting a receiver control message packet number;

detecting a receiver control message through the detected packet number;

detecting public switched telephone network and public switched data network numbers through the receiver control message;

searching for a network information table of the receiver and then detecting an event information table packet number at a time zone corresponding to an event information table construction descriptor in order to search for a corresponding event information table;

inserting a reserved recording descriptor into the event information table to impose an identification number on a corresponding program, thereby performing a reserved recording;

inserting a price information descriptor table into the event information table to transmit program price information; and inserting a caption information descriptor into the event information table to provide information about a caption of a program before broadcasting the program.

2. The method according to claim 1, wherein the step of detecting the receiver control message table comprises the steps of:

searching for a packet number 0 and searching the program association table for a program number 1;

checking a message transmitted to the receiver control message table;

turning back to the searching step to resume a message detection procedure, where the message does not corresponds to the receiver control message table;

calculating an error detection code, where the message corresponding to the receiver control message table;

turning back to the searching step to resume the message detection procedure, if a transmitted error detection code does not match the calculated one; and detecting the public switched telephone network and public switched data network numbers, if the transmitted error detection code matches the calculated one.

3. The method according to claim 1, wherein the step of detecting the event information table packet number at the time zone corresponding to the event information table construction descriptor so as to search for the corresponding event information table, comprises the steps of:

searching for the packet number 0 and searching the program association table for a program number 0;

calculating an error detection code of a network information table packet number and comparing the calculated one to a transmitted one;

turning back to the above searching step to resume this detection procedure if the calculated error detection code does not match the transmitted one;

detecting the event information table construction descriptor if the calculated error detection code matches the transmitted one, and checking if there is the event information table at the time zone corresponding to the event information table construction descriptor;

detecting the event information table packet number if there is the corresponding event information table; and ending this procedure if there is no corresponding event information table.

4. The method according to claim 1, wherein the step of inserting the reserved recording descriptor into the event information table to impose the identification number on the corresponding program, comprises the steps of:

discriminating reserved recording descriptors;

detecting a total length of the reserved recording descriptor;

discriminating different reserved recording methods; and imposing the identification number on a program according to the reserved recording method.

5. The method according to claim 1, wherein the step of inserting the price information descriptor table into the event information table to transmit the program price information, comprises the steps of:

discriminating price information descriptors;

detecting a total length of the price information descriptor;

discriminating different types of pay programs; and providing the program price information according to the type of the program.

6. The method according to claim 1, wherein the step of inserting the caption information descriptor into the event information table to provide the information about the caption of the program before broadcasting the program, comprises the steps of:

discriminating the caption information descriptors;

detecting a total length of the caption information descriptor;

discriminating different captions of the program;

discriminating different types of the caption of the program; and displaying a language utilized for the caption according to the type of the caption.

* * * * *